(12) United States Patent
Valdna et al.

(10) Patent No.: US 6,254,806 B1
(45) Date of Patent: Jul. 3, 2001

(54) HIGH EFFICIENCY POLYCRYSTALLINE PHOSPHORS AND METHOD OF MAKING SAME

(75) Inventors: Vello Valdna, Tallinn (EE); Roger D. Durst, Middleton, WI (US)

(73) Assignee: Bruker AX, Inc., Madison, WI (US)

( * ) Notice: Subject to any disclaimer, the term of this patent is extended or adjusted under 35 U.S.C. 154(b) by 0 days.

(21) Appl. No.: 09/313,565

(22) Filed: May 14, 1999

Related U.S. Application Data

(60) Provisional application No. 60/093,280, filed on Jul. 17, 1998.

(51) Int. Cl.[7] .............................. C09K 11/54; C09K 11/88
(52) U.S. Cl. ........................................................ 252/301.65
(58) Field of Search ......................... 252/301.65, 301.45, 252/301.6 R, 301.4 R

(56) References Cited

U.S. PATENT DOCUMENTS 5,751,108 * 5/1998 Kanemura et al. ................... 313/503

FOREIGN PATENT DOCUMENTS 2-306585 * 12/1990 (JP).
2-306591 * 12/1990 (JP).

OTHER PUBLICATIONS

V. Valdna et al., $ZnSe_{1-x}Te_x$ solid solutions, Journal of Crystal Growth 161 (1996), pp. 177–180.

P. Schotanus et al., Detection of DcS(Te) and ZnSe(Te) scintillation light with silicon photodiodes, IEEE Transactions on Nuclear Science, vol. 39, No. 4, 1992, pp. 546–550.

V.D. Ryzhikov et al., A New $ZnSe_{1-x}Te_x$ Scintillator Luminescence Mechanism, Nucl. Tracks Radlat. Meas., vol. 21, No. 1, 1993, ps. 53–54.

L.P. Gal'chinetskii et al., Determination of Scintillation Efficiency and Photometric Characteristics of X–Ray Phosphors from Results of Emission–Power Measurements, Scientific–Industrial Organization, No. 1, Jan.–Feb., 1991, pp. 88–90.

O.V. Vakulenko et al., Kinetic Characteristics of the X–Ray Luminescence of ZnSe:Te at High Levels of Excitation, Sov. Phys. Tech. Phys. 33(3), Mar. 1988, pp. 384–385.

* cited by examiner

*Primary Examiner*—C. Melissa Koslow
(74) *Attorney, Agent, or Firm*—Kudirka & Jobse LLP

(57) ABSTRACT

A phosphor is provided that has a host material that is doped with a dopant having the chemical structure $XCl_3$, where X is a rare earth element or combination of elements. A free oxygen contributor is also added to provide the free oxygen necessary to activate the rare earth dopant. The processing of the phosphor includes the heating of the phosphor in an over pressure environment of zinc, cadmium or tellurium. The heating is done in a two-temperature zone enclosed environment, so that impurities in the phosphor powder are condensed out on the cooler surface. Altematively, the dopant may be a material that does not include a rare earth element, such as copper, tellurium, cadmium, silver, potassium, manganese, magnesium, calcium, strontium, and barium.

41 Claims, 3 Drawing Sheets

HIGH EFFICIENCY POLYCRYSTALLINE PHOSPHORS AND METHOD OF MAKING SAME

CROSS REFERENCE TO RELATED APPLICATIONS

This application takes priority from U.S. Provisional application Ser. No. 60/093,280, filed Jul. 17,1998.

FIELD OF THE INVENTION

This invention relates to luminescent phosphors and, in particular, those phosphors used in x-ray imaging with CCD and other silicon-based detectors.

BACKGROUND OF THE INVENTION

Luminescent phosphor screens are used in conjunction with CCD detectors (or other silicon detectors) as high resolution, high dynamic range x-ray imagers in x-ray crystallography, medical and industrial imaging. The performance of these devices is heavily dependent on the characteristics of the phosphor material used. Desirable characteristics for a phosphor of this type include high photoluminescent efficiency, peak emission in the red or near-infrared wavelength range, and low afterglow. The desire for high photoluminescent efficiency is due to the obvious advantage of higher sensitivity. Peak emission in the red or near-infrared bands enables the phosphor output to match the maximum quantum efficiency of the silicon detectors. Low afterglow is important for high dynamic range imaging (high afterglow levels lead to ghost images and streaking).

Recently, phosphors based on $ZnSe_{1-x}Te_x$ and $ZnSe_{1-x}Te_x$:Cu:Cl have been developed. These phosphors show high x-ray luminescence with a peak emission near 650–700 nm (depending on the exact doping composition used), and have an energy efficiency of about 20%. Furthermore, they show low afterglow levels as compared to previously available x-ray phosphors. These phosphors are described in detail in V. Valdna, et al., "$ZnSe_{1-x}Te_x$ solid solutions," Journal of Crystal Growth, Vol. 161, 1996, pp. 177–180.

The phosphors disclosed by Valdna have many of the necessary qualities of a good imaging phosphor. However, it has been found that, in their basic formulation, phosphors of this type suffer from a nonlinear output in that, during the initial luminescence of the phosphor while being exposed to constant x-ray flux, the luminescence of the phosphors increases over a finite period of time before stabilizing. Moreover, the phosphors exhibit an undesirable amount of afterglow once the x-ray exposure has been discontinued.

SUMMARY OF THE INVENTION

In accordance with the present invention, a phosphor is provided that uses a zinc selenide host material that has a relatively high starting purity and appropriate grain size, typically 1–2 microns median. If necessary, the purity of the host material may be increased by driving off high vapor pressure contaminants with a vacuum purification step. Once a sufficiently pure host material is acquired, a dopant is added. A fluxing agent, such as zinc chloride ($ZnCl_2$) is preferably used to facilitate diffusion of the dopant into the host. In the preferred embodiment, the dopant comprises a rare earth element and that rare earth element is combined with free oxygen. One method of providing such a combination is to dope the host with a material having the chemical structure $XCl_3$, where Cl is chlorine and X is the desired rare earth material. In the preferred embodiment, the free oxygen is then added by diffusion of a chlorate or nitrate into the host. For example, materials such as potassium chlorate ($KClO_3$), silver chlorate ($AgClO_4$) or silver nitrate ($AgNO_3$) may be used to provide the desired oxygen.

Some examples of rare earth components known to be effective in the aforementioned doping strategy include Europium (Eu), Samarium (Sm), Neodymium (Nd), Gadolinium (Gd), Holmium (Ho), Erbium (Er) and Yfterbium (Yb). Free oxygen is then added to the host. It is also possible to use combinations of rare earth dopants along with the co-dopants used to introduce free oxygen. Some examples of such combinations are Cerium-Terbium (Ce—Tb) and Cerium-Terbium-Erbium (Ce—Tb—Er). Naturally, different rare earth elements or combinations thereof may be selected to achieve a desired wavelength.

In another embodiment of the invention, a dopant is used that has the chemical structure $XCl_2$, and which uses a secondary material that is not a rare earth element. These secondary materials may include copper, tellurium, cadmium, silver, potassium, manganese, magnesium, calcium, strontium, and barium. When using one of these secondary materials, it is not necessary to introduce free oxygen into the host, so no oxygen-contributing material (e.g., chlorate or nitrate) is added. Preferably, the dopants in this embodiment are added in an aqueous solution to a molar dopant concentration of approximately 0.0005, with an appropriate flux (e.g., $ZnCl_2$) at 0.1–5.0% by weight. If the dopant is added in an aqueous solution, the water should be so-called "ultra-high purity distilled water," (that is, greater than 18 MΩ-cm resistivity).

In each of the embodiments discussed above, the addition of the dopant is followed by drying of the phosphor and segregation of the zinc selenide grains. The material is then annealed at a high temperature (e.g., 1000–1200° C.) to diffuse the dopants, to remove any fracture defects caused by the milling and, if a rare earth dopant is used, to form complex defects between the rare earth material and the subsequently added chlorate or nitrate. The phosphor is then washed again, dried and loaded into a two temperature zone container. The hotter zone (the zone containing the phosphor powder) is heated to approximately 1000–1200° C., while the container is slowly rotated. This causes the excess (that is, non-stoichiometric) metal components and high vapor pressure impurities to vaporize, and they thereafter condense out on a surface of the container located in the cooler zone. After this process, the material is cooled, and the cooled phosphor is sieved. If wet sieving or sedimentation is used, ultrapure water should be used, and the material should be subsequently heated again in a two-temperature zone container at lower temperatures so as to remove oxide layers that form on the surface of the power granules.

DETAILED DESCRIPTION OF THE PREFERRED EMBODIMENT

The present invention is directed to an improved phosphor material similar to the prior art phosphor described above, and a method for producing this and other phosphor materials. Like the aforementioned material, the phosphor according to the present invention is a polycrystalline powder. In a preferred embodiment, this powder is zinc selenide (ZnSe) doped with at least one secondary material. In a preferred embodiment the secondary material is a rare earth element that is activated by the addition of free oxygen. In an alternative embodiment, the material is a non-rare earth material, with no oxygen activation.

Various crystal defects appear to some degree in nearly all polycrystalline phosphor powders. Similarly, impurities are common in zinc selenide, a particularly detrimental one being sulfur. We believe that the nonlinearity characteristics of the prior art phosphor are due to such defects and impurities in the crystal structure. We also believe that defects and impurities in the material are the cause of the afterglow in the prior art phosphor. The following method describes a preferred embodiment for preparing a phosphor material according to the invention. Those skilled in the art will recognize that various changes may be made in this method without deviating from the scope of the invention. Such changes may include omitting one or more of the steps, adding other processing steps, or changing the order in which the steps are performed.

Figure 1A:
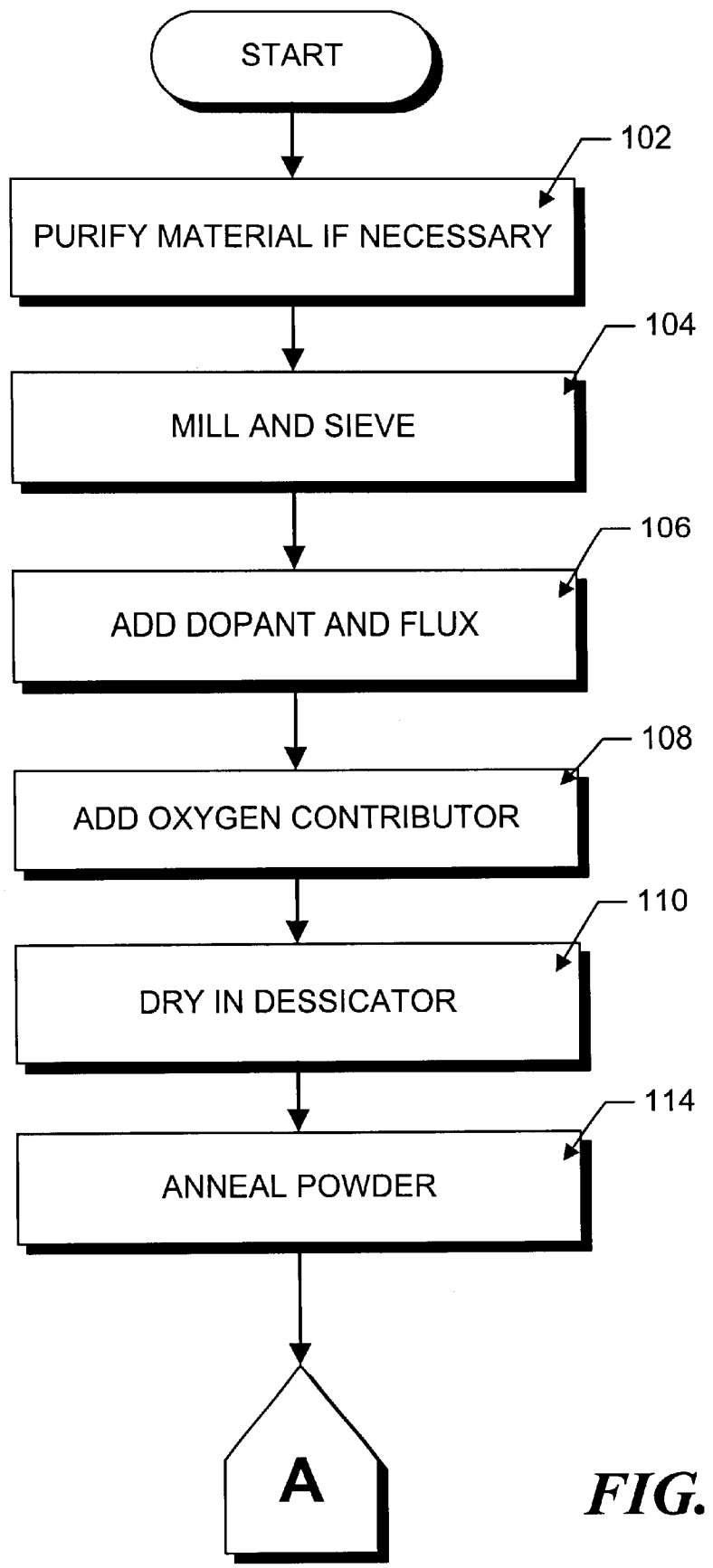
FIGS. 1A–1B together form a flowchart depicting schematically the general steps involved in producing a phosphor according to the present invention.
Figure 1B:
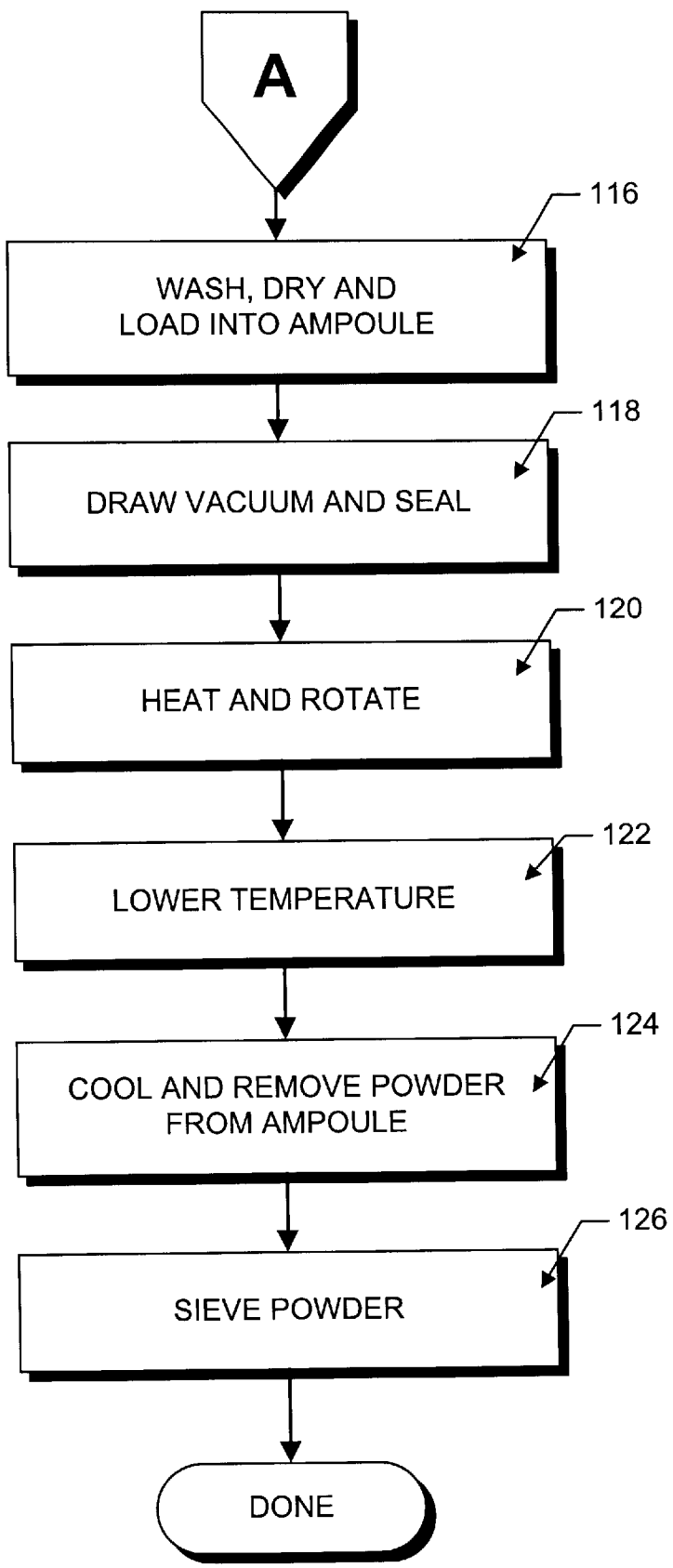

The preferred method steps of the invention are depicted in a flow diagram in FIG. 1. The desired purity for the starting host material is at least 99.9999%. However, less pure materials may be used if purged of certain deleterious impurities. One material that is sufficiently pure in its starting state is CVD grade zinc selenide available from Phase 4 Infrared Corp., Lowell, Mass. However, if it is necessary to remove deleterious impurities, such as sulfur, nickel, cobalt, carbon and iron, known purification techniques may be used. This is shown in FIG. 1 as step 102. Once the desired starting host material is acquired, the raw host material is milled and sieved to about one-micron average particle size using a ceramic surfaced mill (such as agate or zirconia) or a ceramic-surfaced vortex air mill (step 104).

After the host material is properly milled, the desired dopant is added along with the appropriate fluxing agent (step 106). The dopant is preferably added as an aqueous solution to a molar concentration of 0.0002–0.0010. In the preferred embodiment, the dopant includes a rare earth element such as europium (Eu), samarium (Sm), neodymium (Nd), gadolinium (Gd), holmium (Ho), erbium (Er) and ytterbium (Yb). Combinations of rare earth materials, such as Cerium-Terbium (Ce—Tb) and Cerium-Terbium-Erbium (Ce—Tb—Er) may also be used. The rare earth dopants provide high photoluminescence when activated by the addition of free oxygen. Thus, a source of oxygen is diffused into the host along with the dopant. In the preferred embodiment, the oxygen source is a chlorate or nitrate. Examples include potassium chlorate ($KClO_3$), silver chlorate ($AgClO_4$) or silver nitrate ($AgNO_3$). The use of gaseous oxygen as an activator is less desirable, as it is difficult to achieve uniform distribution of the oxygen throughout the doped material. While the use of most chlorates or nitrates results in an additional unnecessary material in the resulting phosphor, one may be used that is not particularly deleterious to the performance of the phosphor. Zinc chlorate would be a desirable material for this purpose, but tends to decompose at a temperature too low to withstand subsequent processing of the phosphor.

In the preferred embodiment, the rare earth dopant is added by adding a material with the chemical structure $XCl_3$, where X is the desired rare earth element or combination of elements. An appropriate flux, such as zinc chloride ($ZnCl_2$) is also added to the material to promote diffusion of the dopant and the oxygen-contributing additive into the host material. Those skilled in the art will recognize that different flux materials may be used as well. In the preferred embodiment, the $ZnCl_2$ fluxing agent is added in an amount of 0.1–5.0% by weight. The flux reduces the effective melting temperature of the host, allowing for purging at lower temperatures.

Following addition of the dopant, the oxygen-contributing material and the flux, the host powder is dried in a dessicator at approximately 70–100° C. for about 2–3 hours (step 110). The powder is then annealed at a temperature of 1000–1200° C. to diffuse the dopant and oxygen–contributor, to form complex crystal defects with the rare earth material and the oxygen-contributor and to remove any fracture defects caused by milling (step 114). The material is then washed with ultrapure water, dried and loaded into an ampoule (step 116).

Figure 2:
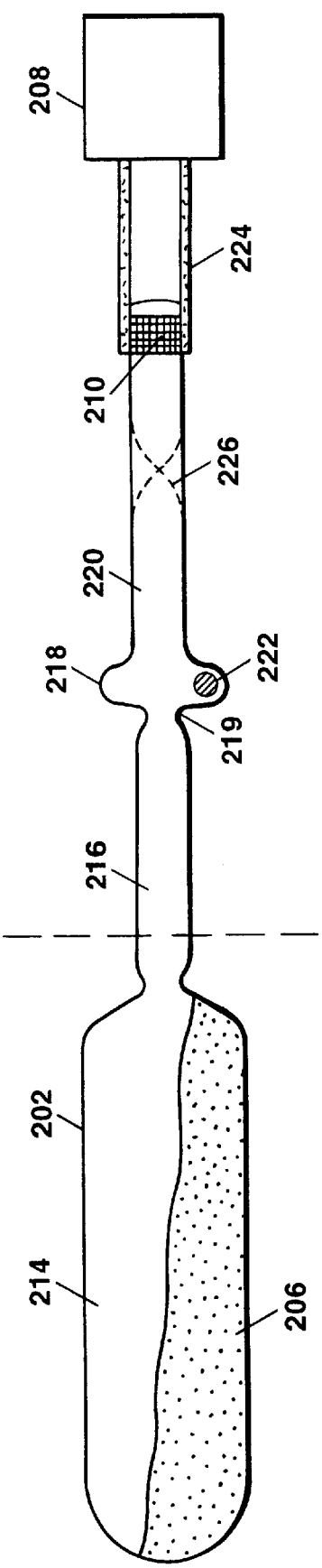
FIG. 2 is a schematic diagram of components used during fabrication of a phosphor according to the present invention.

An appropriate quartz ampoule 202 is shown in FIG. 2 with the milled, doped ZnSe powder 206 residing in a powder–containing section 214 of the ampoule. In the preferred embodiment, the ampoule has different diameter regions of different lengths. The powder-containing section 214 is approximately 150 mm in length, with a diameter of 33–38 mm. Narrow ampoule sections 216, 220 are each approximately 150 mm in length with a diameter of 9–12 mm. The open end of ampoule section 220 is connected to vacuum hose 224 that leads to vacuum pump 208.

Between the narrow ampoule sections 216, 220 is a component trap 218. The component trap 218 has a diameter larger than that of the narrow sections 216, 220, but smaller than powder section 214. The trap 218 is sized so that a portion of it will contain a chuck 222 of material used to generate a particular metal vapor environment during the purifying process. In particular, the trap 218 is an annular cavity that is axially symmetric about an axis passing through the length of the ampoule. In the preferred embodiment, the chuck is zinc, and is used to generate a zinc vapor atmosphere, as described below. Furthermore, the ampoule has a constriction 219 between section 216 and trap 218 that is narrower than the diameter of chuck 222 so that the chuck can be loaded into the ampoule after the powder, and will not enter the powder section 214 and contaminate the host. The description that follows makes reference to both the method steps of FIGS. IA and 1B and the ampoule components shown in FIG. 2.

Once the host powder is located in section 214 of the ampoule, and the chuck is located in the trap 218, filter the vacuum hose 224 is connected to the open end of ampoule section 220. Using the vacuum pump, the ampoule is pumped down to less than $10^{-6}$ Torr and sealed using a gas torch or a vacuum valve (step 118). Broken lines 226 in FIG. 2 are used to indicate the location at which the ampoule is sealed in the preferred embodiment. The sealed ampoule is then placed in a two-zone furnace, the labels "Zone I" and "Zone II" being used in FIG. 2 to indicate which sections of the ampoule are located in which zone. The ampoule is then heated to further process the host powder. During the time that it is heated, it is maintained at a horizontal angle, and slowly rotated (at approximately 0.3–1.0 RPM) (step 120). As part of the invention, heating and moving of the doped host material may be used for purification. For example, the material may be located in a vacuum chamber, and then heated to a predetermined temperature below its melting point. This predetermined temperature, however, is high enough to allow the vaporization of a high vapor pressure impurity in the material.

In the preferred embodiment, Zone 1 is heated to a temperature of 900–12000° C., while Zone ll is simultaneously heated to a temperature of 880–1180° C. The temperature in Zone 1 is high enough to drive high vapor pressure impurities out of the host powder. Meanwhile, the temperature in Zone ll is high enough to vaporize a portion of the chuck 222. This creates a metal vapor overpressure in the ampoule, providing an atmosphere for the powder during processing. The use of metal vapors, such as zinc, tellurium or cadmium, allows the creation of a solid solution with the host that can modify the electronic properties of the host crystal. For example, the use of a zinc overpressure can decrease zinc vacancy defects in the host, while overpressures of tellurium and cadmium can modify the crystal bandgap to shift the wavelength of luminescence and decrease the concentration of shallow electron traps, thereby reducing afterglow.

The temperatures of the ampoule are maintained for 1–3 hours, after which Zone 1 is cooled to about 470° C., and Zone ll is cooled to about 300° C. (step 122). The ampoule is maintained at these temperatures, while being rotated, for another 1–20 hours, depending on the quantity of phosphor being processed. During this time, materials with a high vapor pressure at the process temperature (e.g., adsorbed gases, excess materials such as zinc or silicon, etc.) that have evaporated out of the powder, condense out on the cold ampoule walls in Zone II. After this cycle, the ampoule is removed from the furnace and allowed to cool to room temperature. The ampoule 202 may then be opened by first drilling a small hole (<0.1 mm diameter) in it with a diamond drill. After the interior ampoule pressure has equilibrated at atmospheric pressure, the ampoule may be safely opened completely with a diamond saw, and the purified powder removed (step 124). The cooled phosphor is then sieved to allow the smaller, desired particles to be separated from the larger ones (step 126). If wet sieving or sedimentation is used, an ultrapure water solution should be used, and the phosphor should be subsequently annealed to remove any oxide layer that forms.

In an alternative embodiment of the invention, the dopant does not include a rare earth material. Instead, the dopant has the chemical structure $XCl_2$, where X is one of a number of different elements or a combination of a number of those elements. For example, X may be copper (Cu), tellurium (Te), cadmium (Cd), silver (Ag), potassium (K), manganese (Mn), magnesium (Mg), calcium (Ca), strontium (Sr), and barium (Ba). These dopants are added to the host powder in the same way as described above for the rare earth dopants, except that no oxygen–contributing materials are necessary to activate the dopant. Thus, no chlorate or nitrate material would be added. However, the remainder of the method is the same, including the vacuum purification of the material.

While the invention has been shown and described with reference to a preferred embodiment thereof, those skilled in the art will recognize that various changes in form and detail may be made herein without departing from the spirit and scope of the invention as defined by the appended claims.

What is claimed is:

1. A phosphor comprising:
   a polycrystalline host powder consisting essentially of zinc selenide, zinc telluride or zinc selenide telluride; and
   a dopant that comprises a rare earth element, the rare earth element being activated by a source of free oxygen diffused into the phosphor.

2. A phosphor according to claim 1 wherein the rare earth dopant comprises at least one of europium, samarium, neodymium, gadolinium, holmium, erbium, ytterbium, cerium and terbium.

3. A phosphor according to claim 1 wherein the rare earth element of the dopant is added as part of a material having the chemical structure $XCl_3$, where X comprises the rare earth element.

4. a phosphor according to claim 1 wherein the source of free oxygen comprises an oxygen contributor comprising a chlorate or a nitrate.

5. A phosphor according to claim 4 wherein the oxygen contributor comprises at least one of potassium chlorate, silver chlorate and silver nitrate.

6. A phosphor according to claim 1 wherein the dopant is added as part of an aqueous solution that comprises ultrapure water.

7. A phosphor according to claim 1 wherein the phosphor is heated in a metal vapor environment.

8. A phosphor according to claim 1 wherein the phosphor is heated in a container with multiple temperature zones, such that impurities are driven from the phosphor in a first temperature zone and condensed on a surface of the container in a second temperature zone cooler than the first zone.

9. A phosphor according to claim 1 wherein the molar concentration of the dopant is approximately 0.0002–0.0010.

10. A phosphor according to claim 1 wherein the phosphor has been annealed.

11. A composition of matter comprising:
    a polycrystalline powder host material consisting essentially of zinc selenide, zinc telluride or zinc selenide telluride; and
    a dopant consisting essentially of a rare earth material converted to an oxidized material within the host, wherein the rare earth material is diffused into the host, and is subsequently activated by the diffusion of an oxygen donor compound into the host that reacts with and oxidizes the rare earth material.

12. A composition according to claim 11 wherein the rare earth material comprises at least one of europium, samarium, neodymium, gadolinium, holmium, erbium, ytterbium, cerium and terbium.

13. A phosphor according to claim 11 wherein the rare earth element of the dopant is added as part of a material having the chemical structure $XCl_3$, where X is the rare earth material.

14. A composition according to claim 11 wherein the oxygen donor compound comprises chlorate or nitrate.

15. A composition according to claim 11 wherein the composition is a phosphor.

16. A composition according to claim 11 wherein the host material comprises a compound that includes one element defined by two electrons in its outermost shell, and one element defined by four electrons in its outermost shell.

17. A method of producing a phosphor comprising:
    providing a polycrystalline powder host material consisting essentially of zinc selenide, zinc telluride or zinc selenide telluride;
    doping the host with a substance that includes a dopant that comprises a rare earth material; and
    activating the dopant by diffusing a source of free oxygen into the doped host material.

18. A method according to claim 17 wherein the rare earth element of the dopant is added as part of a material having the chemical structure $XCl_3$, where X comprises the ram earth material.

19. A method according to claim 17 further comprising purging the host material of a high vapor pressure impurity.

20. A method according to claim 19 wherein purging the host material comprises locating the host material in a vacuum chamber, and heating it to a temperature below its melting point but high enough to allow the vaporization of the high vapor pressure impurity.

21. A method according to claim 17 wherein doping the host material comprises adding an aqueous solution to the host material.

22. A method according to claim 17 wherein doping the host material comprises doping the host material to a molar dopant concentration of 0.0002–0.0010.

23. A method according to claim 17 wherein providing a host material comprises providing a host material that comprises a compound that includes an element defined by having two electrons in its outermost shell, and an element defined by having four electrons in its outermost shell.

24. A method of producing a phosphor comprising:
providing a solid host material consisting essentially of zinc selenide, zinc telluride or zinc selenide telluride;
doping the host with a substance that includes a dopant that comprises a rare earth material and that creates photoluminescent centers in the host material, the dopant being activated by a source of free oxygen; and
purifying the doped host material by locating it in a vacuum chamber, and heating it to a temperature below its melting point but high enough to allow the vaporization of a high vapor pressure impurity within the doped host material.

25. A method according to claim 24 further comprising moving the host material within the vacuum chamber during heating.

26. A method according to claim 24 further comprising maintaining an inner surface of the vacuum chamber at a temperature below the vaporization temperature of said impurity such that the impurity condenses out onto said inner surface.

27. A method according to claim 24 wherein doping the host material comprises doping the host material to a molar dopant concentration of 0.0002–0.0010.

28. A method according to claim 24 wherein heating of the phosphor takes place in a metal vapor environment.

29. A method according to claim 24 wherein heating of the phosphor takes place in a container with multiple temperature zones, such that impurities are driven from the phosphor in a first temperature zone and condensed on a surface of the container in a second temperature zone cooler than the first zone.

30. A method according to claim 24 wherein providing a host material comprises providing a host material comprising zinc selenide.

31. A method of producing a phosphor comprising:
providing a host material consisting essentially of zinc selenide, zinc telluride or zinc selenide telluride;
doping the host material with a secondary material having the chemical structure $XCl_3$, where X comprises a rare earth material;
diffusing an oxygen donor compound into the doped host material that reacts with and oxidizes the secondary material; and
locating the doped host material in a vacuum chamber, and heating it to a temperature below its melting point but high enough to allow the vaporization of at least one impurity in the zinc selenide, said heating being while maintaining an inner surface of the vacuum chamber at a temperature below the vaporization temperature of said impurity such that the impurity condenses out onto said inner surface.

32. A method according to claim 31 wherein doping the host material comprises doping the host material to a molar dopant concentration of 0.0002–0.0010.

33. A method according to claim 31 wherein the oxygen donor compound comprises a chlorate or nitrate.

34. A method according to claim 31 wherein heating of the phosphor takes place in a metal vapor environment.

35. A phosphor comprising:
a polycrystalline zinc selenide host powder; and
a dopant that comprises a rare earth element and that has been activated by a source of free oxygen diffused into the phosphor, wherein the phosphor is heated in a metal vapor environment.

36. A phosphor comprising:
a polycrystalline zinc selenide host powder; and
a dopant that comprises a rare earth element and that has been activated by a source of free oxygen diffused into the phosphor, wherein the phosphor is heated in a container with multiple temperature zones, such that impurities are driven from the phosphor in a first temperature zone and condensed on a surface of the container in a second temperature zone cooler than the first zone.

37. A phosphor comprising:
a polycrystalline zinc selenide host powder; and
a dopant that comprises a rare earth element and that has been activated by a source of free oxygen diffused into the phosphor, wherein the molar concentration of the dopant is approximately 0.0002–0.0010.

38. A phosphor comprising:
a polycrystalline zinc selenide host powder; and
a dopant that comprises a rare earth element and that has been activated by a source of free oxygen diffused into the phosphor, wherein the phosphor has been annealed following the addition of the dopant.

39. A method of producing a phosphor comprising:
providing a zinc selenide host material;
doping the host material with a secondary material having the chemical structure $XCl_3$, where Cl is chlorine and X comprises a rare earth material;
diffusing an oxygen donor compound into the doped host material that reacts with and oxidizes the secondary material; and
locating the doped host material in a vacuum chamber, and heating it to a temperature below its melting point, the temperature being high enough to allow the vaporization of at least one impurity in the zinc selenide, said heating being while maintaining an inner surface of the vacuum chamber at a temperature below the vaporization temperature of said impurity such that the impurity condenses out onto said inner surface, wherein doping the host material comprises doping the host material to a molar dopant concentration of 0.0002–0.0010.

40. A method of producing a phosphor comprising:
providing a zinc selenide host material;
doping the host material with a secondary material having the chemical structure $XCl_3$, where Cl is chlorine and X comprises a rare earth material;
diffusing an oxygen donor compound into the doped host material that reacts with and oxidizes the secondary material; and
locating the doped host material in a vacuum chamber, and heating it to a temperature below Its melting point, the temperature being high enough to allow the vaporization of at least one impurity in the zinc selenide, said heating being while maintaining an inner surface of the vacuum chamber at a temperature below the vaporization temperature of said impurity such that the impurity condenses out onto said inner surface, wherein the oxygen donor compound comprises a chlorate or nitrate.

41. A method of producing a phosphor comprising:

providing a zinc selenide host material;

doping the host material with a secondary material having the chemical structure $XCl_3$, where Cl is chlorine and X comprises a rare earth material;

diffusing an oxygen donor compound into the doped host material that reacts with and oxidizes the secondary material; and locating the doped host material in a vacuum chamber, and heating it to a temperature below its melting point, the temperature being high enough to allow the vaporization of at least one impurity in the zinc selenide, said heating being while maintaining an inner surface of the vacuum chamber at a temperature below the vaporization temperature of said impurity such that the Impurity condenses out onto said inner surface, wherein heating of the phosphor takes place in a metal vapor environment.

* * * * *